United States Patent [19]
Thomas

[11] 3,890,121
[45] June 17, 1975

[54] NOBLE GAS ABSORPTION PROCESS

[75] Inventor: Jess W. Thomas, Chatham, N.J.

[73] Assignee: The United States of America as represented by the United States Energy Research and Development Administration, Washington, D.C.

[22] Filed: Feb. 19, 1974

[21] Appl. No.: 443,262

[52] U.S. Cl. .................................. 55/62; 55/66
[51] Int. Cl. ................................... B01d 53/02
[58] Field of Search .............. 55/66, 74, 62, 58

[56] References Cited
UNITED STATES PATENTS

| | | | |
|---|---|---|---|
| 1,906,917 | 1/1931 | Peters | 55/66 X |
| 2,793,507 | 5/1957 | Hnilicka | 55/66 X |
| 3,192,687 | 7/1965 | Silva et al. | 55/33 |
| 3,542,525 | 11/1970 | Pigford et al. | 55/62 X |
| 3,713,272 | 1/1973 | Barrere, Jr. et al. | 55/62 X |

*Primary Examiner*—Charles N. Hart
*Assistant Examiner*—Ethel R. Cross
*Attorney, Agent, or Firm*—John A. Horan; Leonard Belkin

[57] ABSTRACT

The method of removing a noble gas from air comprising the use of activated carbon filters in stages in which absorption and desorption steps in succession are conducted in order to increase the capacity of the filters.

6 Claims, 8 Drawing Figures

NOBLE GAS ABSORPTION PROCESS

BACKGROUND OF THE INVENTION

The invention described herein was made in course of employment with the U.S. Atomic Energy Commission.

It is known that one of the principal internal radiation hazards in the mining of uranium is the presence of radon due to its immediate degradation products as described in U.S. Pat. No. 3,555,278 issued Jan. 12, 1971. However, although radon daughters are the principal inhalation hazard, rather than the radon itself, removal of the daughters alone is unsatisfactory since unacceptable concentration levels of the daughters are rapidly produced from relatively small amounts of radon.

At present, the radon daughter hazard is controlled by high air ventilation rates. This can be quite expensive, particularly for deep mines, since long ventilating shafts and large exhaust blowers are required.

The use of carbon to remove radon in mines has been previously considered, but previous studies concluded generally that the quantity of carbon required to accomplish this function would be excessive, and hence impractical.

SUMMARY OF THE PRESENT INVENTION

It is known, as pointed out in "Measurement of Dynamic Adsorption Coefficients For Noble bases on Activated Carbon" by Siegiwarth, et al., appearing in the Proceedings of the 12th AEC Air Cleaning Conference (1972) that the rate of penetration, or breakthrough, of krypton and xenon through a carbon bed is independent of the noble gas concentration when the latter is present in low concentration. This suggests also that a given quantity of carbon will purify a given quantity of air, regardless of the radon concentrations in the entering air.

The present invention utilizes the principle described above to provide a practical method of employing carbon to remove a noble gas such as krypton, xenon or radon from air when present in relatively small amounts.

In accordance with the principles of the invention, there is provided a method for the removal of the noble gas such as radon from air comprising the steps of passing a finite volume of the air through a charcoal filter to adsorb the radon, then passing a substantially reduced volume of air through said filter after heating the latter to a temperature sufficient to release the radon so that latter is carried away in the reduced volume of air, followed by cooling and passing the reduced volume of air containing the radon through a second charcoal filter to adsorb all the radon present. The first filter may be utilized again to adsorb radon from a second finite volume of air followed by the previously mentioned steps to add this radon removed to the radon adsorbed in the second filter. The process is fully applicable to the other noble gases kryton and xenon.

As the rate of penetration, or breakthrough, of the noble gas through a carbon bed is independent of the noble gas concentration provided it is present in low concentration, so that a given quantity of carbon will purify a given quantity of air, it is seen that the process described has an "amplifying factor." That is, the second filter will accept a number of charges equal to the ratio of the finite volume of air being purified in the first filter to the volume of air removing the noble gas and purified in the second filter. As an example, if the first filter cleans a given volume of air and one tenth that volume is employed to redeposit the noble gas in the second filter, there is an amplifying factor of ten, so that the second filter is capable of adsorbing ten times the noble gas of the first filter. Extending this process to a third charcoal bed with the same amplifying factor, the bed would have the capacity of cleaning 100 times the given volume cleaned by the first filter.

It is therefore a principal object of this invention to provide an efficient process for the removal of a noble gas such as krytop, xenon, or radon from air.

Other objects and advantages of this invention will hereinafter be obvious from the following description of preferred embodiments of this invention.

DESCRIPTION OF THE PREFERRED EMBODIMENTS

Figure 1:
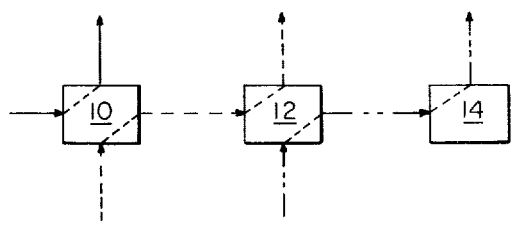
FIGS. 1 and 2 show schematically two embodiments, respectively, of this invention.

As shown in FIG. 1, air containing radon to be removed is passed (as shown by the solid lines) through an activated charcoal filter bed 10 until the latter starts permitting radon to pass. Then bed 10 is heated to a suitable temperature while simultaneously a second flow of air (as shown by the broken lines) is passed through bed 10 to carry away the radon released by heating. The second flow of air which is at a rate which is substantially below that of the first flow, is cooled and passed through a second activated filter bed 12, which will remove all of the radon. If desired, additional stages, such as a third filter bed 14 operating at a further reduction in the rate of air flow may be employed. If the volume of air depositing radon in filter 10 is $V_1$, and the volume of air depositing radon in filter 12 is $V_2$, then the radon adsorbed by filter 12 is $V_1/V_2$ times the amount of radon adsorbed by filter 10. The third stage filter 14 provides an additional multiplication or amplification stage.

In the operation of this process, there appears to be no critical or limiting conditions as to temperature or pressure. However, adsorption is more effective as the temperature is lowered and the higher the desorption temperature the higher the radon concentration which can be obtained in the effluent. For the purposes of this invention, adsorption is preferably conducted with the filter at a temperature less than about 100° C whereas during desorption the filter temperature should be at least 20° C higher than the sorption temperature. It is the elevation of temperature from adsorption to desorption which produces the amplification, and the greater the elevation, the greater will be the amplification. Increasing the desorption temperature increases the rapidity of desorption and this increases the concentration which can be obtained. With regard to pressure, both adsorption and desorption are conducted at about atmospheric pressure, with only enough pressure i.e. of the order of 2 inches of water, to provide flow. Increase in system pressure will cause a larger quantity of radon to be adsorbed per unit volume of carbon, and decrease of pressure the opposite.

With regard to concentration of the radon, in a uranium mine without ventilation, the radon is typically present in 50,000 pCi/liter which is equal to about $3.5 \times 10^{-11}$ vol %. This process as herein described will operate successfully up to concentrations of about $10^{15}$ pCi/liter so that for the particular application described e.g., removal of radon from air found in uranium mines, there is no practical upper limit of concentration to be obtained during the course of the adsorption-desorption sequence.

It has also been discovered that during adsorption, increase in humidity results in lowered adsorption efficiency, although the process is still effective at any relative humidity. Over the range of from zero to 100% relative humidity, adsorption efficiency decreases by about 50%.

Figure 2:
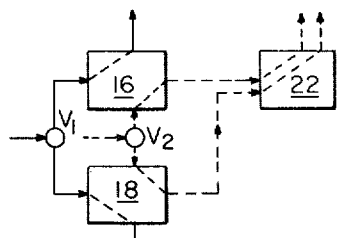

For an arrangement which permits continuous removal of radon from air, reference is made to FIG. 2. Air containing radon is passed by valve $V_1$ into a first activated charcoal bed 16 until the latter starts to pass radon. The air flow is then directed by valve $V_1$ to a second charcoal bed 18 for continued removal of radon. The first charcoal bed is then subject to desorption by a reduced volume of air directed by valve $V_2$. This is accomplished by heating the charcoal bed to a suitable temperature range while air to entrain the radon is flowed through, picking up the radon released. The air containing the desorbed radon is then passed through a third activated charcoal bed 22, in effect transferring the radon from the one charcoal bed to another, after cooling.

When the second charcoal bed 18 ceases to adsorb radon from the air containing radon, the air flow is switched back by valve $V_1$ to first bed 16, and second bed 18 is desorbed with reduced air volume directed by valve $V_2$. The radon-enriched air from second bed 18 may then be passed through third bed 22 for adsorption of the radon.

It is also seen that subsequent desorption of third filter 22 by still further reduced amounts of air can be employed to concentrate the radon even further in another charcoal filter. The only limitation is that the maximum concentration obtainable is about 0.7% by volume or under. Above this value it no longer holds true that the rate of penetration of radon is independent of concentration.

It should be pointed out that for best results air which is free of radon is most useful in any of the desorption stages. However, ambient air containing some radon could be used, if the amount of radon present is relatively small compared to the amount to be desorbed. The choice would depend largely on economic factors.

The following is an example of this invention as embodied in a laboratory investigation of the process.

In the adsorption step a radon-air mixture was passed into a carbon bed at a known flow rate, radon concentration and humidity, and the "transmission" vs. time curve determined. This dimensionless, fractional transmission T is defined as the concentration of radon in the carbon bed effluent divided by the influent concentration at any time.

Figure 3:
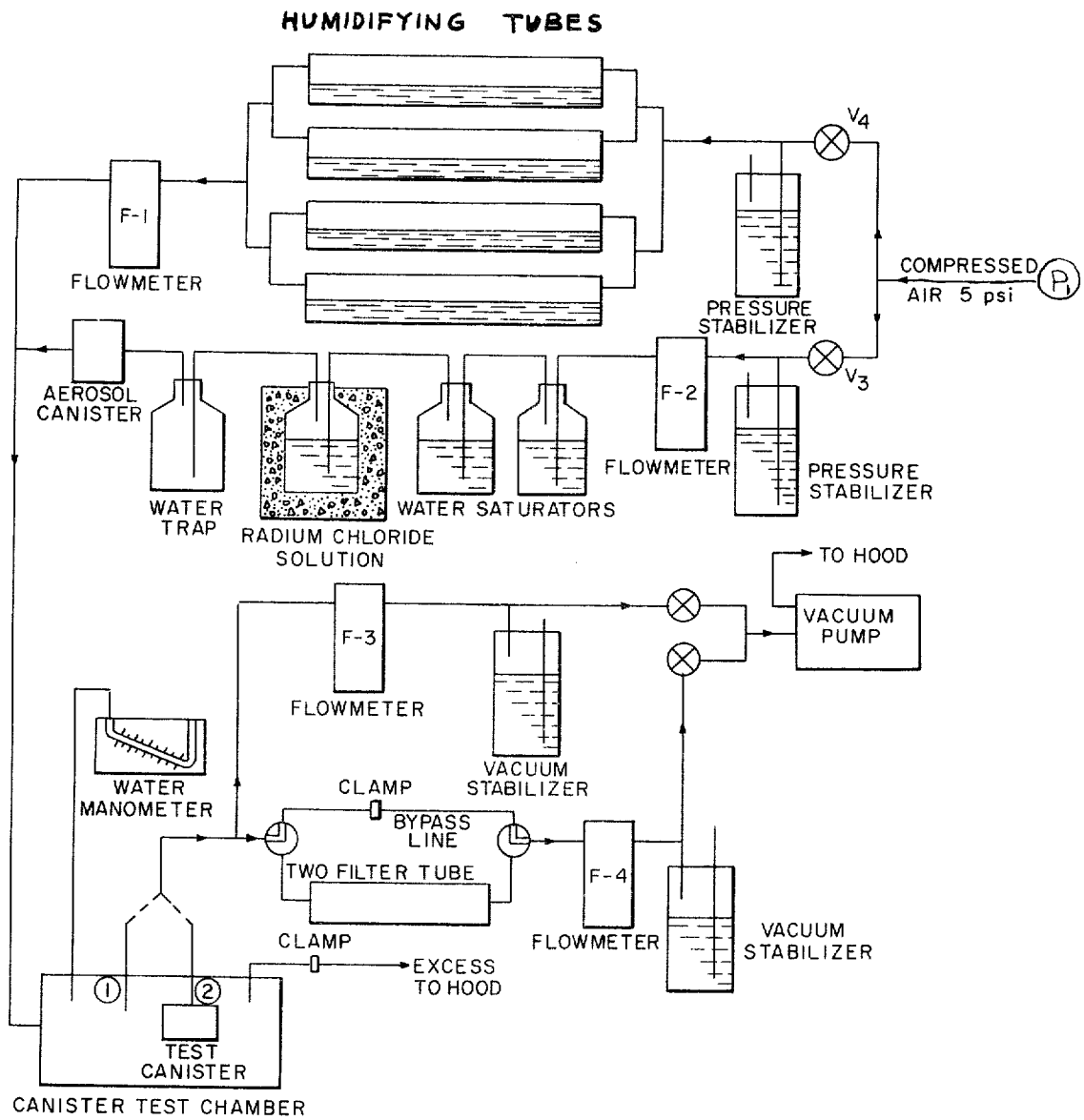
FIG. 3 illustrates schematically radon adsorption apparatus employed in one example of this invention.
Figure 5:
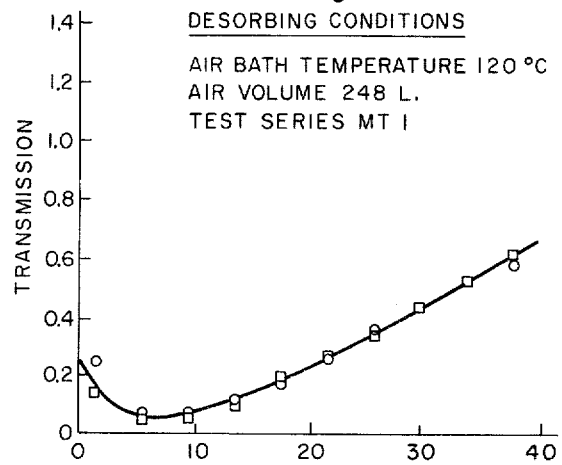
FIGS. 5 – 8 show transmission curves for various test series.
Figure 7:
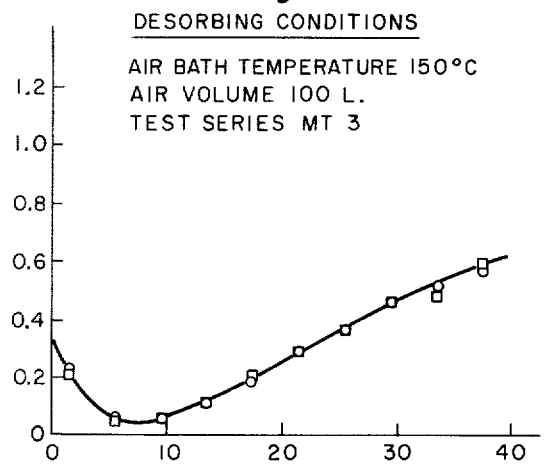
Figure 6:
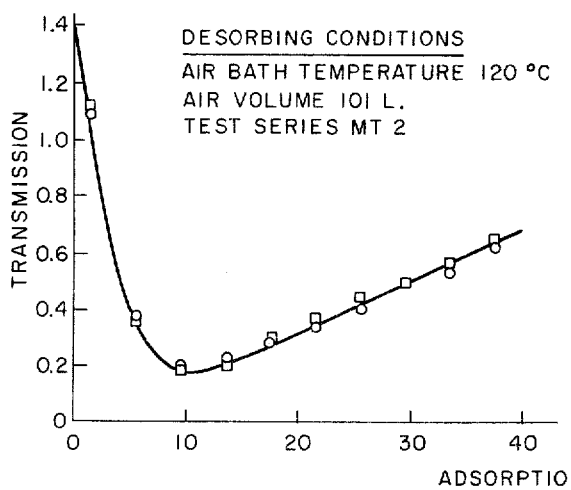
Figure 8:
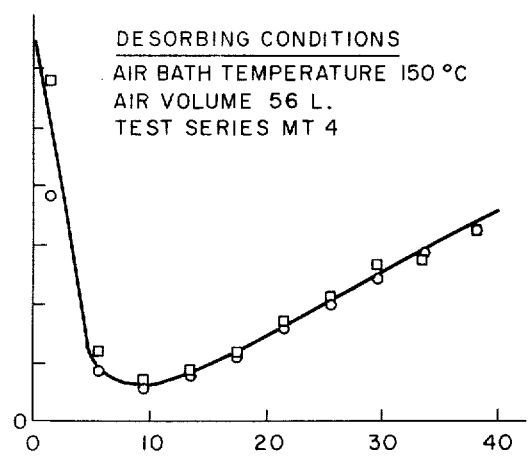

Details of the adsorption test apparatus employed are shown in FIG. 3. Radon was generated by taking air pumped from pump $P_1$, saturating it in the water saturators shown and bubbling it at the rate of 1 l/min through a radium chloride solution containing several millicuries of Ra-226. The rate of production of radon was found to be about 900,000 pCi/min. An "aerosol canister" containing two layers of high efficiency filter paper was used downstream of the solution to remove any entrained aerosol from the radium solution. The main air supply for the apparatus entered through flowmeter F-1 at 69 l/min and was humidified to about 9.0 mg/l by means of the humidifying tubes shown. The total flow influent to the test chamber was 69 + 1 = 70 l/min, which provided a radon concentration of about 900,000/70 = 13,000 pCi/l. Valves $V_3$ and $V_4$ were employed to control the flow rates.

The carbon bed was tested at a flow of 56.6 l/min, which was maintained by two flowmeters, F-3 at 48.6 l/min and F-4 at 8 l/min. The 8 l/min flow line was needed to measure radon concentrations in the effluent from the test carbon bed. This line was provided with a bypass, so that the total flow of 56.6 l/min could be maintained whether or not a concentration sample was being obtained.

To prepare for an adsorption test, the air flow was turned on through flowmeters F-1 and F-2, and about 2 or 3 hours allowed for establishment of equilibrium conditions. The waiting period was necessary to allow time for accumulated radon in the radium bubbler solution to be swept out into the hood, and to allow the water in the humidifying tubes to reach an equilibrium temperature. It was found that after the waiting period the apparatus would produce a constant ($\pm 5\%$) radon concentration for 24 hours/day for a period of days or weeks, with replenishment of the water level in the water saturators and humidifying tubes every few days. Immediately prior to the test, the input radon concentration was measured at 8 l/min using the two-filter method described in Thomas, et al., (1970), Health Phys. 10, 113, sampling from line 1 in the canister test chamber. Usually four determinations were taken prior to a test, and four after completion of the test. After establishing the input radon concentration, the canister was attached to line 2 and the radon concentration in the canister output determined continuously to permit calculation of radon transmission. Transmission curves were plotted from the test data by considering the average transmission obtained over the three-minute sampling period to be the instantaneous transmission at the midpoint of the sampling period.

The carbon bed tested was that of a commercial gas mask canister. This canister contained about 900 ml (400 grams) of activated carbon (Witco Chemicals Co., Type AC-337, 6/16 mesh). This is a petroleum base carbon and has a surface area of about 1400 square meters per gram. The carbon bed in the canister was very nearly rectangular, with a cross sectional area of about 60 cm$^2$ perpendicular to the direction of air flow, and height of about 15 cm in the direction of air flow. Hence the superficial air velocity through the bed was 56,600/(60) (60) = 15.7 cm/sec.

Figure 4:
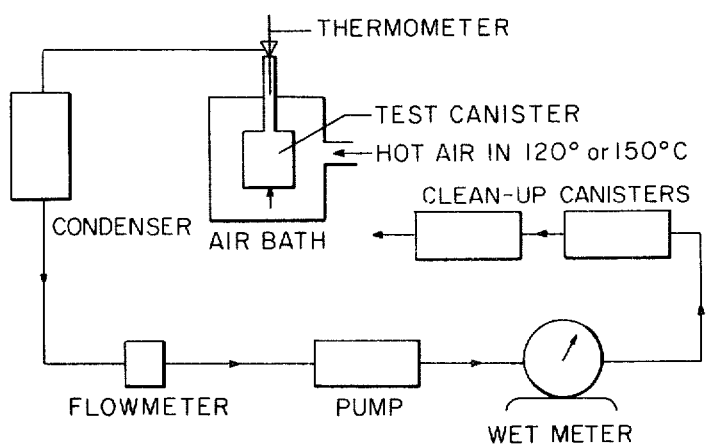
FIG. 4 illustrates schematically desorption apparatus employed in the same example.

The desorption test apparatus was relatively simple, as shown in FIG. 4. Heating or cooling air was supplied by a small blower equipped with an electrical resistance heater. This device supplied a blast of air at about 120 l/min and by means of a variable transformer on the resistance heater of the gun, temperatures could be controlled up to about 250°C. The nozzle of the gun was installed through the side of a 20 liter air bath container and the canister placed inside for heating. A water condenser was placed in the canister effluent line to collect the several grams of water which are evolved in each desorption step. A capillary type flowmeter was used to measure flow rate, and a standard wet test meter to register total volume of desorbing air. Two protective canisters in series were inserted downstream of the apparatus as shown. These canisters permitted confirmation that a second carbon bed would accept many charges of radon from the canister undergoing desorption, and they also prevented evolution of radon into the laboratory.

The desorption procedure was as follows: the canister was removed from the adsorption apparatus and placed in the air bath, preset at the desired temperature. Immediately, air from the hot air bath was drawn through the canister at a low flow rate of about 1 l/min. Theoretically, it is inefficient to pull air through the canister while it is still at room temperature, as there is little radon desorption per unit volume of desorbing air and the capacity of the second bed for radon is thereby partially wasted. However, it was necessary to pull air at a low flow through the canister at the start of the heating step; otherwise the gases evolved from the carbon, as it heats up, would go out the canister inlet. As these gases constitute part of the desorbed air volume, their volume must be measured by the downstream wet meter.

After a preliminary heating time of about 15 to 25 minutes, at the low flow rate the air flow through the system was increased to sweep off most of the adsorbed radon from the hot carbon. From the total volume of desorption air and the volume of air cleaned in the adsorption step, the amplifying factor of the process was calculated. The temperature of the carbon in the heating step was not measured directly but was estimated roughly from the temperature of the air entering and leaving the canister. After the heating period, the canister was removed from the hot air bath and cooled for 15 minutes. The total desorption time, including cooling, was 45 minutes in each test series.

Four series of tests were done using the same canister. The same adsorption procedure, but a different desorption procedure, was used in each series of four to six replicate runs. This method was adopted to obtain transmission curves in each series that were reproducible and not affected by the treatment of the previous test series. FIGS. 5 – 8 show the adsorption transmission curves for the four different series. Only two of the adsorption runs are plotted for each series. Data from the other runs, except for the first one or two, fell on the same line and show that the process was highly reproducible.

All of the curves show a characteristic shape; the transmission at zero adsorption time is moderate or high; this drops and then again rises with time. The initial transmission in test series MT-2 and MT-4 was greater than unity. This may be understood by consideration of process details. During desorption the radon concentration in the gas phase of the carbon bed is higher than during adsorption, because of the higher temperature. Hence, if desorption is incomplete and the canister still warm, the initial adsorption flow can sweep off the high radon concentration and result in transmissions over unity. The initial high transmission could have been avoided by use of more desorbing air but probably the advantage gained in the adsorption thereby would have been more than neutralized by the increased quantity of desorbing air required. In all four series, the flow of desorbing air was in the same direction as it was in the adsorption test. In retrospect, it would have been better to have used reverse flushing which would have effected higher desorption efficiency, since at the end of the adsorption step the radon concentration in the carbon is higher at the inlet of the carbon bed than at the exit.

The transmission curves were integrated graphically to obtain the fraction F of the total input radon adsorbed by the canister in the 40 minute test period. The quantity of interest is the net amount of air completely cleaned of radon in the adsorption step, since, for example, cleaning X liters of air per minute at 50% efficiency is as effective in reducing ambient radon concentrations as is cleaning X/2 liters per minute at 100% efficiency. The volume of $V_A$ air completely cleaned was therefore calculated from the flow rate and test time to be $$V_A = (56.6)(40)(F) = 2264 \text{ F liters.}$$

A summary of results for the four test series is given in Table 1. As previously mentioned, two different flow rates were used during desorption. The flow rates given are approximate, hence the total desorption volume, $V_D$, which was measured with an accurate wet test meter, does not agree exactly with the volume calculated from the flow rates. The temperatures listed are those of the air entering the canister (the air bath temperature) and of the air leaving the canister. The latter values have a range, since the air flow was started immediately after insertion of the cold canister into the hot air bath. From these inlet and outlet temperatures it was estimated that the average carbon temperature was about 100° for the 120° air bath temperature and 120° for the 150° air bath temperature. The last column shows the amplifying factor obtained for the different desorption treatments. Comparison of test series MT-1 and MT-2 shows an improvement of about a factor of 2 in amplification by reducing the desorption air volume from 248 liters to 101 liters. This reduced desorption volume more than compensated for the resulting decrease in net volume of air cleaned in the adsorption step, which dropped from 1630 to 1290 liters. Test series MT-3 was done to determine the gain that could be achieved by increasing heat; for an estimated increase of 20° in average carbon temperature, the amplifying factor rose from 12.8 to 16.1 due to lower transmission on the adsorption step. The last test series MT-4 was done to see if the desorbing air volume could be further reduced without affecting the adsorption transmission curve too adversely. The somewhat lower net volume of air cleaned on the adsorption step was more than compensated for by the decrease in desorption air volume and the amplifying factor increased from 16.1 to 23.4. It seemed apparent that the amplifying factor of the process could be further increased by other modifications of desorbing conditions.

To confirm that the transmission of radon through a carbon bed is independent of the gas concentration when the gas is present in the concentrations described herein, dry canisters of the type described above were tested at radon concentration of 1600 and 38,000 pCi/l, with all other conditions being held as nearly constant as possible. The results are summarized in Table 2 for intercomparison. This table shows that the radon concentration has no detectable effect on the rate of radon adsorption. Further technical details, not necessary to an understanding of this invention, but providing further information, are given in the U.S. Atomic Energy Commission, Health and Safety Laboratory report HASL-280, Jan. 1974.

The results of test series MT-4 can be applied to a system containing 4 carbon beds, to estimate the net quantity of air which could be cleaned continuously per liter of carbon. The process is assumed to have three one-liter carbon beds and one two-liter bed, and is designed to clean 60 l/min of air at 80% radon removal efficiency. Two primary barbon beds A and B operate alternately in parallel at 60 l/min during the 45 minute adsorption time, and at an average flow rate of 2 l/min during the desorption time, also 45 minutes. Since the radon removal efficiency is 80%, the net quantity of air cleaned in the adsorption step ($V_A$) is (60) (0.80) (45) = 2160 liters. The quantity of desorption air used ($V_D$) is (45) (2) or 90 liters. Hence the amplification factor is 2160/90 = 24. The primary beds A and B are desorbed into bed C, which also contains one liter of carbon. With the amplifying factor of 24, this bed has the capacity to remove 24 charges of desorbed radon over a time period of 24 × 45 minutes, or 18 hours, before requiring desorption. After the 45 minute desorption of bed C, at 2 l/min, beds A and B are put back on stream, with bed C receiving the desorbed radon from beds A and B as before. This system results in beds A and B operating 96% of the time.

Bed D receives one charge of desorbed radon from bed C every 18.75 hours. If it contained one liter of carbon as do beds A, B and C, it would have an amplifying factor of 24, and a hold up time of 18.75 days. To avoid the necessity of desorbing this bed, it is made to contain 2 liters of carbon and hence has a hold up time of 37.5 days or about 10 radon half lives. The flow from bed D will therefore contain negligble amounts of radon.

The overall process, including the flow from beds C and D, removes about 80% of the radon in 60 l/min of incoming air with the use of 5 liters of carbon. Hence the net cleaning capacity of this hypothetical system is about 10 l/min per liter of carbon. It seems very probable that optimization of the system, particularly of desorbing conditions, could greatly increase the efficiency of the process. The process was evaluated with the adsorption taking place at room temperature about 25°C. Better performance would be expected at the lower temperatures existing in mines.

Based upon technical information available this process is applicable to the removal of the other noble gases krypton and xenon with the same temperature, pressure and other operating conditions applying except that larger carbon beds would be required for the same removal capacity.

TABLE 1

SUMMARY OF RESULTS

| Test Series | Adsorption Step | | Desorption Step | | | | $V_D$ (liters) | Amplification Factor $V_D/V_A$ |
|---|---|---|---|---|---|---|---|---|
| | F | $V_A$ (liters) | Time (min.) | Flow Rate l/min. | Temperatures | | | |
| | | | | | In (°C) | Out (°C) | | |
| MT-1 | 0.72 | 1630 | 15 | 1 | 120 | 30 to 70 | 248 | 6.6 |
| | | | 15 | 16 | 120 | 75 to 95 | | |
| MT-2 | 0.57 | 1290 | 25 | 1 | 120 | 30 to 75 | 101 | 12.8 |
| | | | 5 | 16 | 120 | 75 to 85 | | |
| MT-3 | 0.71 | 1610 | 25 | 1 | 150 | 30 to 85 | 100 | 16.1 |
| | | | 5 | 16 | 150 | 85 to 100 | | |
| MT-4 | 0.58 | 1310 | 25 | 1 | 150 | 30 to 85 | 56 | 23.4 |
| | | | 5 | 6.4 | 150 | 85 to 100 | | |

TABLE 2

EFFECT OF RADON CONCENTRATION ON LIFE OF M11 CANISTERS*

| Randon Concentration (pCi/l) | Temp. (°C) | Humidity (mg/l) | Canister Life (min) Transmission | | | |
|---|---|---|---|---|---|---|
| | | | 2% | 10% | 30% | 50% |
| 1,640 | 24 | 0.2 | 13 | 17 | 22 | 27 |
| 37,250 | 23 | 0.2 | 13 | 18 | 23 | 27 |
| 1,650 | 23 | 5.0 | 9 | 13 | 17 | 22 |
| 39,100 | 23 | 5.3 | 10 | 13 | 17 | 21 |
| 1,590 | 23 | 18.0 | 4 | 7 | 10 | 12 |
| 37,050 | 23 | 17.0 | 5 | 8 | 11 | 13 |

*Flow rate was 16 l/min.

What is claimed is:

1. The method of removing a noble gas selected from the group consisting of krypton, xenon and radon from air containing concentrations thereof up to about $10^{15}$ pCi/liter comprising the steps of:
   a. passing a finite volume of an influent of said air at some flow rate through a first activated charcoal filter to adsorb the noble gas present in said air;
   b. then heating said first charcoal filter to drive off said noble gas and passing through said first charcoal filter a substantially reduced finite volume of air containing concentrations of said noble gas up to about $10^{15}$ pCi/liter at a reduced flow rate to form an effluent containing said noble gas released by said first charcoal filter;
   c. cooling said effluent;
   d. passing said effluent through a second activated charcoal filter for adsorbing the noble gas present.

2. The method of claim 1 in which said first charcoal filter is maintained during adsorption at a temperature under about 100°C.

3. The method of claim 2 in which said first charcoal filter is maintained during desorption at a temperature at least 20°C higher than the adsorption temperature.

4. The method of claim 3 in which said second charcoal filter is maintained during adsorption at a temperature less than 100°C.

5. The method of claim 1 in which the steps of paragraphs a, b, c, and d are repeated so as to increase the amount of noble gas collected in said second charcoal filter.

6. The method of claim 5 in which said influent is passed through another charcoal filter at some flow rate during the period said first filter is being heated to release its noble gas, followed by heating of said additional filter and simultaneously passing air containing concentrations of said noble up to about $10^{15}$ pCi/liter at a reduced flow rate through the aforesaid additional filter while said first filter is receiving said influent, the effluent from said additional filter thereafter passing through said second filter for removal of the noble gas present.

* * * * *